United States Patent
Buss et al.

(10) Patent No.: US 11,714,418 B2
(45) Date of Patent: Aug. 1, 2023

(54) METHOD FOR THE AUTOMATED CONTROL OF A MOTOR VEHICLE

(71) Applicant: ZF Friedrichshafen AG, Friedrichshafen (DE)

(72) Inventors: Markus Buss, Düsseldorf (DE); Martin Keller, Ratingen (DE); Torsten Bertram, Düsseldorf (DE); Christian Lienke, Dortmund (DE); Christian Wissing, Dortmund (DE); Andreas Homann, Dortmund (DE); Manuel Schmidt, Dortmund (DE); Niklas Stannartz, Dortmund (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/850,126

(22) Filed: Apr. 16, 2020

(65) Prior Publication Data

US 2020/0333792 A1   Oct. 22, 2020

(30) Foreign Application Priority Data

Apr. 17, 2019   (DE) ..................... 10 2019 110 217.0

(51) Int. Cl.
*G05D 1/02*    (2020.01)
*G01C 21/34*   (2006.01)
*B60W 60/00*   (2020.01)

(52) U.S. Cl.
CPC ......... *G05D 1/0217* (2013.01); *B60W 60/001* (2020.02); *G01C 21/3407* (2013.01);
(Continued)

(58) Field of Classification Search
None
See application file for complete search history.

(56) References Cited

U.S. PATENT DOCUMENTS 6,085,147 A * 7/2000 Myers ................ G01C 21/3492
342/36
6,663,196 B1 * 12/2003 Mueller .................. B60T 8/172
303/144

(Continued)

FOREIGN PATENT DOCUMENTS

| DE | 102014223000 | 5/2016 |
| DE | 102015221612 | 5/2017 |
| DE | 102105221626 | 5/2017 |

OTHER PUBLICATIONS

K. Chu, M. Lee and M. Sunwoo, "Local Path Planning for Off-Road Autonomous Driving With Avoidance of Static Obstacles," in IEEE Transactions on Intelligent Transportation Systems, vol. 13, No. 4, pp. 1599-1616, Dec. 2012, doi:10.1109/TITS.2012.2198214. (Year: 2012).*

*Primary Examiner* — Rachid Bendidi
*Assistant Examiner* — Selena M Jin
(74) *Attorney, Agent, or Firm* — Tarolli Sundheim Covell & Tummino L.L.P.

(57) ABSTRACT

A method for the automated control of a motor vehicle (10) is presented. The method includes the following steps:
  Generating and/or receiving a reference trajectory (T*) for the motor vehicle (10);
  Generating at least two possible trajectories ($\hat{x}_i$) for the motor vehicle (10);
  Comparing the at least two possible trajectories ($\hat{x}_i$) with the reference trajectory (T*); and
  Selecting one of the at least two possible trajectories ($\hat{x}_i$) based on the comparison of the at least two possible trajectories ($\hat{x}_i$) with the reference trajectory (T*).
A control device (24) for a system for the control of a motor vehicle (10) is also proposed.

12 Claims, 3 Drawing Sheets

(52) U.S. Cl.
CPC ..... *G01C 21/3453* (2013.01); *B60W 2420/42* (2013.01); *B60W 2420/52* (2013.01); *B60W 2520/10* (2013.01); *B60W 2520/14* (2013.01)

(56) References Cited

U.S. PATENT DOCUMENTS

| | | | |
|---|---|---|---|
| 2014/0067252 A1 | 3/2014 | Knoop et al. | |
| 2015/0371544 A1* | 12/2015 | Mere | G08G 5/0039 |
| | | | 701/3 |
| 2019/0317512 A1* | 10/2019 | Zhang | G05D 1/0238 |
| 2020/0139959 A1* | 5/2020 | Akella | G05D 1/0088 |
| 2020/0156639 A1* | 5/2020 | Liu | B60W 40/105 |
| 2020/0198657 A1* | 6/2020 | Manderla | B60W 40/13 |

* cited by examiner

METHOD FOR THE AUTOMATED CONTROL OF A MOTOR VEHICLE

BACKGROUND OF THE INVENTION

The invention relates to a method for the automated control of a motor vehicle, a control device for a system for the control of a motor vehicle, a motor vehicle, as well as a computer program for carrying out the method.

One of the main challenges for driver assistance systems that control the longitudinal movement and transverse movement of a motor vehicle in a partially automated manner, and above all for fully automated motor vehicles, is to analyze a specific situation in which the motor vehicle is located and, based on this, to determine and carry out appropriate driving maneuvers for the vehicle motor vehicle in real time.

The complexity of the calculation of the driving maneuvers generally increases with the duration of the individual driving maneuvers. If different possible driving maneuvers are to be determined for a longer period of time, for example longer than three seconds, or if complex driving maneuvers with a plurality of lane changes are involved, previously known methods are often no longer able to determine them in real time.

A particular challenge here is that in almost every traffic situation there are many different possibilities in which the motor vehicle can be controlled. The various possibilities can differ greatly, for example in terms of the travel time required. Especially in heavy traffic, the previously known methods are often no longer able to select the appropriate one from the various possibilities for controlling the motor vehicle.

SUMMARY OF THE INVENTION

The object of the invention is therefore to provide a method and a control device for a system for the control of a motor vehicle, in which the disadvantages from the prior art are improved.

The object is achieved according to the invention by a method for the automated control of a motor vehicle, with the following steps:

A reference trajectory for the motor vehicle is generated and/or received. At least two possible trajectories for the motor vehicle are generated. The at least two possible trajectories are compared with the reference trajectory, and one of the at least two possible trajectories is selected based on the comparison of the at least two possible trajectories with the reference trajectory.

The reference trajectory is a space-time curve and corresponds to a target driving maneuver that the motor vehicle should carry out.

The "possible trajectories" are those trajectories that correspond to driving maneuvers that the motor vehicle can carry out within a predefined period.

The method according to the invention is based on the basic idea of decoupling the driving maneuver planning and the subsequent control of the motor vehicle from one another. In a first step, the reference trajectory is generated or obtained in the driving maneuver planning. In a next step, the possible trajectories, that is to say trajectories that the motor vehicle can carry out in a predefined period of time, are determined and compared with the reference trajectory. Based on this comparison, the possible trajectory that is most similar to the reference trajectory is then selected, generally speaking. By decoupling these two steps, each of the individual steps can be carried out much faster, which means that overall a shorter time is required to determine the driving maneuver to be carried out.

One aspect of the invention provides that the possible trajectories are generated by means of a mathematical replacement model of the motor vehicle, in particular wherein the mathematical replacement model is a non-linear model and/or a single-track model. The use of a non-linear model ensures that the mathematical replacement model can predict the actual behavior of the motor vehicle even in driving situations with high longitudinal and/or transverse accelerations. The use of a single-track model, on the other hand, reduces the computing time and/or the other resources required to generate the possible trajectories.

In particular, the mathematical replacement model that is used to generate the possible trajectories is of higher order than a mathematical replacement mode that is used for driving maneuver planning, that is, for the generation of the reference trajectory. When generating the reference trajectory, it is less relevant to be able to reproduce the details of the behavior of the motor vehicle. For example, a simple point mass model of the motor vehicle with corresponding secondary conditions is sufficient for this, so that additional computing time is saved.

According to a further aspect of the invention, at least one input variable is taken into account in the mathematical replacement model when generating the possible trajectories, in particular wherein the input variable is a steering movement, in particular a steering wheel angle, an acceleration, a deceleration, a speed and/or a yaw rate of the motor vehicle. The possible trajectories are then determined based on the input variable.

In particular, each of the possible trajectories corresponds to exactly one set of input variables. In other words, a plurality of sets of input variables are created and a possible trajectory is generated for each of these sets of input variables. The possible trajectories are therefore predicted trajectories for predefined steering movements, in particular steering wheel angles, accelerations, decelerations, speeds and/or yaw rates of the motor vehicle.

Preferably, at least one of the input variables, in particular all, is treated as a constant, so that the possible trajectories each correspond to the driving maneuver which the motor vehicle carries out with constant steering movement, in particular with constant steering wheel angle, with constant acceleration, with constant deceleration, with constant speed and/or with constant yaw rate of the motor vehicle.

One embodiment of the invention provides that the at least one input variable, in particular all input variables, is such a variable that can be detected by means of an in-vehicle sensor, in particular an acceleration sensor, a steering angle sensor, a radar, a LIDAR and/or a camera. In particular, all input variables can be recorded by in-vehicle sensors. Accordingly, the possible trajectories are then determined solely on the basis of such variables that can be recorded by the motor vehicle itself, more precisely by the sensors inside the vehicle. There is therefore no need for any further input variables which would have to be determined from outside the motor vehicle, for example from a control center or from other motor vehicles.

A cost factor is preferably assigned to the possible trajectories by means of a cost functional in order to compare the possible trajectories with the reference trajectory, in particular the cost functional comprising at least a distance between a point on the respective possible trajectory and a corresponding point on the reference trajectory. In particular, those points on the respective possible trajectory of the reference trajectory that have the same time coordinate are compared. The "distance" of the points is therefore the spatial distance between the points. Accordingly, the smaller the distances between the points on the possible trajectories and the corresponding points on the reference trajectory, the smaller the cost factor.

The one of the possible trajectories is preferably selected whose associated cost factor is the smallest in comparison with the other possible trajectories.

More preferably, a plurality of points on the respective possible trajectory is included in the cost functional, a contribution of the individual points to the cost factor being weighted using a first weighting function. In this way, the individual points on the possible trajectories contribute to the cost factor to different extents. A suitable Valerie sealing function can accordingly focus on certain segments of the possible trajectories or the reference trajectory. For example, less important segments can be weighted less for driving maneuver planning, while more important segments can be weighted more heavily for driving maneuver planning.

In a further embodiment of the invention, the first weighting function is time-dependent, in particular a time-dependent Gaussian curve.

Accordingly, the individual points on the possible trajectories can be weighted depending on how far they lie in the future.

Basically, a strong weighting of points that are very close in time means that the motor vehicle adheres more closely to the reference trajectory, but there are also oscillations of the motor vehicle around the reference trajectory. In contrast, for a strong weighting of points far in time means that the motor vehicle adheres less strongly to the reference trajectory, but oscillations of the motor vehicle are also reduced by the reference trajectory.

The possible trajectories can have at least three time segments, the weighting of the points in the middle of the time segments being greater than the weighting of the points in the other time segments, in particular wherein the weighting of the points in the earliest of the time segments is greater than the weighting of the points in the latest of the time segments. This variant represents a compromise between the properties of the trajectory fidelity described above and the oscillation around the reference trajectory.

The first weighting function is preferably a Gaussian function, the expected value of which lies in the middle segment of the time segments.

In a further embodiment of the invention, a course angle, a yaw angle and/or a float angle of the motor vehicle in the course of the possible trajectories is determined based on the mathematical replacement model and taken into account in the cost functional, in particular taking into account a difference between the course angle and a sum of the yaw angle and float angle. Accordingly, not only is it taken into account whether the motor vehicle follows the reference trajectory, but also whether the orientation of the motor vehicle is suitable relative to the reference trajectory. In particular, the cost factor increases for those trajectories which have a large sum of yaw angle and float angle compared to the course angle and which therefore, for example, require the motor vehicle to "drift."

The determined course angle, the determined yaw angle, and/or the determined float angle of the motor vehicle are preferably weighted by means of a second weighting function, in particular the weighting function being time-dependent. Analogous to the case described above of the differently weighted distance between different points on the possible trajectories of reference trajectory, the orientation of the motor vehicle with respect to the reference trajectory at different points of the possible trajectories can be weighted differently in this way.

The first weighting function and the second weighting function can be the same or different from one another. In particular, the first and the second weighting functions are each a Gaussian function.

According to one aspect of the invention, the motor vehicle is controlled at least partially, in particular completely automatically, based on the selected trajectory. The motor vehicle is preferably controlled by a system for controlling the motor vehicle, which has a control device which is designed to carry out the method described above.

The object is also achieved according to the invention by a control device for a system for controlling a motor vehicle or for a motor vehicle, the control device being designed to carry out an above-described method for automated control of the motor vehicle. Accordingly, the control device is designed to control the motor vehicle at least partially automatically, in particular fully automatically. With regard to the further advantages and properties, reference is made to the above explanations regarding the method, which also apply to the control device.

The object is further achieved according to the invention by a motor vehicle with a control device described above, in particular wherein the motor vehicle has at least one vehicle-internal sensor, in particular an acceleration sensor, a steering angle sensor, a radar, a LIDAR, and/or a camera. With regard to the advantages and features, reference is made to the above explanations regarding the method, which correspondingly also apply to the motor vehicle.

The object is also achieved according to the invention by a computer program having program code means in order to carry out the steps of a method described above if the computer program is executed on a computer or a corresponding computing unit, in particular a computing unit of a control device described above. With regard to the advantages and features, reference is made to the above explanations regarding the method, which correspondingly also apply to the computer program.

The term "program code means" refers here and below to computer-executable instructions in the form of program code and/or program code modules in compiled and/or in uncompiled form, which can be in any programming language and/or in machine language.

BRIEF DESCRIPTION OF THE DRAWINGS

Further advantages and properties of the invention will become apparent from the following description and the accompanying drawings, to which reference is made. In these drawings.

DESCRIPTION

Figure 1:
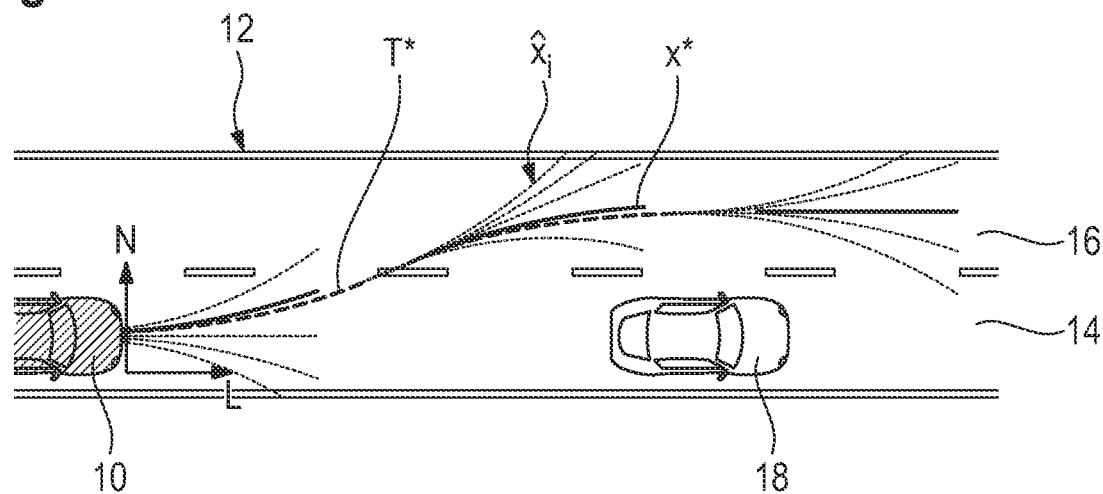
FIG. 1 shows schematically a road traffic situation.

FIG. 1 shows schematically a road traffic situation in which a motor vehicle 10 is traveling on a road 12 in a current lane 14. Another lane 16 runs adjacent to the current lane 14.

Another road user 18 also drives on the road 12 in the current lane 14. In the example shown, the other road user 18 is a passenger car, but it could also be a truck, a motorcycle or any other road user.

In addition, a coordinate system with a longitudinal axis and a normal axis is shown in FIG. 1, the longitudinal axis defining a longitudinal direction L and the normal axis defining a transverse direction N. The origin of the coordinate system lies in the longitudinal direction L at the current position of the tip of the motor vehicle 10 and, viewed in the longitudinal direction L, on the right side of the road.

This special coordinate system, which is also used in the following, is a road-fixed coordinate system, which consequently does not therefore move with the motor vehicle 10. Of course, any other coordinate system can also be used.

Figure 2:
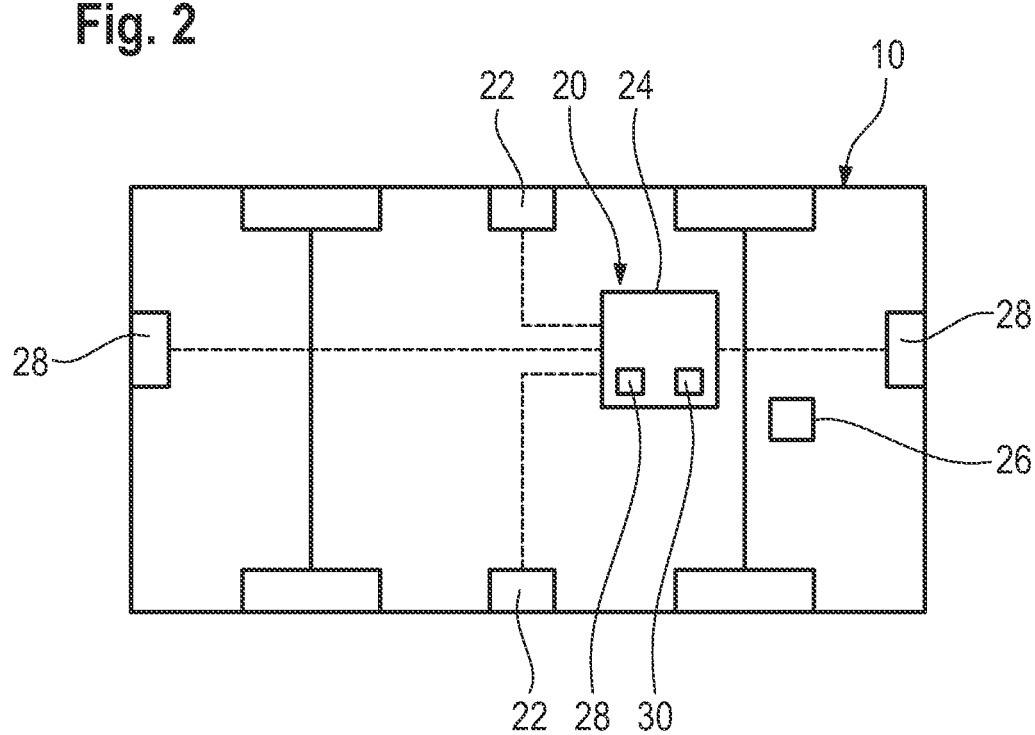
FIG. 2 shows a schematic block diagram of a system for the control of a motor vehicle by means of a method according to the invention.

As shown in FIG. 2, the motor vehicle 10 has a system 20 for the control of the motor vehicle 10. The system 20 comprises a plurality of sensors 22 and at least one control device 24.

The sensors 22 are arranged here at the front, rear and/or on the side of the motor vehicle 10 and are designed to detect the surroundings of the motor vehicle 10, to generate corresponding environment data and to forward them to the control device 24. More specifically, the sensors 22 record information at least about the current lane 14, the further lane 16 and the at least one other road user 18.

The sensors 22 are each a camera, a radar sensor, a distance sensor, a LIDAR sensor and/or any other type of sensor that is suitable for detecting the surroundings of the motor vehicle 10.

As an alternative or in addition, at least one of the sensors 22 can be designed as an interface to a control system, which is assigned to at least the segment of the road 12 shown and is designed to transmit environment data about the road 12 and/or about the other road users to the motor vehicle 10 and/or to the at least one other road user 18. In this case, the one sensor 22 can be designed as a mobile radio communication module, for example for communication in accordance with the 5G standard.

In addition, the motor vehicle 10 comprises at least one further sensor 26 which, in general terms, is designed to record movement data about the motor vehicle 10.

More specifically, the at least one further sensor 26 is designed to detect an acceleration of the motor vehicle 10, a deceleration of the motor vehicle 10, a steering movement of the motor vehicle 10, a steering wheel angle, a yaw rate of the motor vehicle 10 and/or a speed of the motor vehicle 10. The corresponding measurement data are forwarded by the at least one further sensor 26 to the control device 24.

In general terms, the control device 24 processes the environment data and/or measurement data obtained from the sensors 22 and the movement data received from the at least one further sensor and controls the motor vehicle 10 in an automated manner, in particular fully automatically, based on the processed environment data and movement data. A driver assistance system is thus implemented on the control device 24, which can control a transverse movement and/or a longitudinal movement of the motor vehicle 10 at least partially in an automated manner, in particular fully automatically.

For this purpose, the control device 24 is designed to carry out the method steps explained below with reference to FIGS. 3 to 5. More precisely, the control device 24 comprises a data carrier 28 and a computing unit 30, a computer program being stored on the data carrier 28, which is executed on the computing unit 30 and comprises the program code means in order to carry out the steps of the method explained below for the automatic control of the motor vehicle 10.

Figure 3:
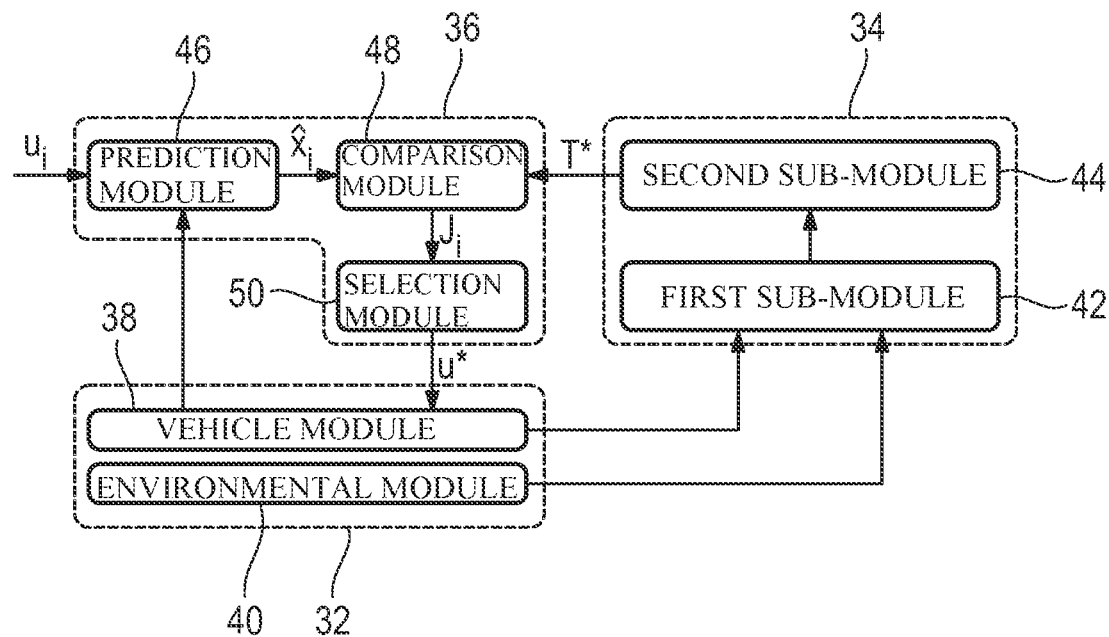
FIG. 3 shows a schematic block diagram of a computer program for executing the steps of the method according to the invention.

A block diagram of the computer program is shown schematically in FIG. 3. The computer program has a sensor and control module 32, a driving maneuver planning module 34 and a control module 36.

The sensor and control module 32 has a vehicle module 38 which is designed to process the movement data from the at least one further sensor 26 of the motor vehicle 10.

In addition, the vehicle module 38 is designed to control the motor vehicle 10 at least partially in an automated manner, in particular fully automatically. The vehicle module 38 is thus designed to generate control commands and/or control variables for actuators and/or further control devices of the motor vehicle 10 and to send them to the actuators and/or the control devices which are necessary for at least partially automated control of the motor vehicle.

In particular, the vehicle module 38 sends the control commands and/or manipulated variables to a steering control device that regulates a steering angle of the motor vehicle 10, to an engine control device that regulates an acceleration and a speed of the motor vehicle 10, and to a brake control device that regulates a deceleration of the motor vehicle 10.

The sensor and control module 32 also has an environment data module 40, which is designed to process the environmental data from the sensors 22 and to transmit them to the driving maneuver planning module 34.

The driving maneuver planning module 34 has a first sub-module 42 and a second sub-module 44.

The first sub-module 42 receives the processed movement data and the processed environment data from the vehicle module 38 or from the environment data module 40 and generates a plurality of possible driving maneuvers for the motor vehicle 10 based on the processed movement data and/or the processed environment data.

More specifically, the first sub-module 42 generates a set of possible driving maneuvers for the motor vehicle 10 and forwards this set of possible driving maneuvers to the second sub-module 44.

A "driving maneuver" is to be understood here and in the following also always as a corresponding space-time trajectory, which describes the driving maneuver in a coordinate system with generally two space dimensions and one time dimension.

The first sub-module 42 generates the possible driving maneuvers based on a mathematical model of the motor vehicle 10. In particular, this is a simplified model of the motor vehicle 10 with a reduced number of degrees of freedom, so that less computing power and/or fewer other resources are required to generate the possible driving maneuvers.

For example, to generate the set of possible driving maneuvers, the motor vehicle is approximated as a point mass, which is subject to predefined kinematic and/or dynamic restrictions.

The second sub-module 44 selects a target driving maneuver from the set of possible driving maneuvers, generates a corresponding reference trajectory T* and forwards the reference trajectory T* to the control module 36.

In general terms, the reference trajectory T* is a space-time curve that the motor vehicle 10 must follow in order to carry out the target driving maneuver.

The target driving maneuver can be selected based on predefined criteria. For example, a cost factor is assigned to the respective driving maneuvers via a cost functional, the target driving maneuver then being the one that extremizes, in particular minimizes, the cost functional.

Alternatively or additionally, the target driving maneuver is selected by means of an appropriately trained machine learning module, in particular wherein the machine learning module comprises an artificial neural network.

Accordingly, the target driving maneuver is a driving maneuver that is optimized compared to similar possible driving maneuvers, in particular an optimal driving maneuver that is optimized compared to all other possible driving maneuvers.

The reference trajectory T* is thus forwarded to the control module 36, the reference trajectory T* corresponding to the target driving maneuver that is to be carried out by the motor vehicle 10.

In general terms, the control module 36 is designed to determine suitable actuating variables for the actuators and/or further control devices of the motor vehicle 10, so that the motor vehicle 10 is controlled along the reference trajectory T*. The manipulated variables are, for example, a steering angle and an acceleration of the motor vehicle 10, the expression acceleration here comprising both a positive acceleration and a deceleration.

For this purpose, the control module 36 has a prediction module 46, a comparison module 48 and a selection module 50.

The prediction model 46 first generates a plurality of different, possible trajectories $\hat{x}$ for the motor vehicle 10. This plurality of possible trajectories is generated based on a mathematical replacement model of the motor vehicle 10.

In general, the mathematical replacement model is of a higher order here than the mathematical replacement model that is used by the driving maneuver planning module 34, since it is important to determine the appropriate manipulated variables for the actuators of the motor vehicle 10 so that the mathematical replacement model can predict the actual behavior of the motor vehicle 10.

Figure 4:
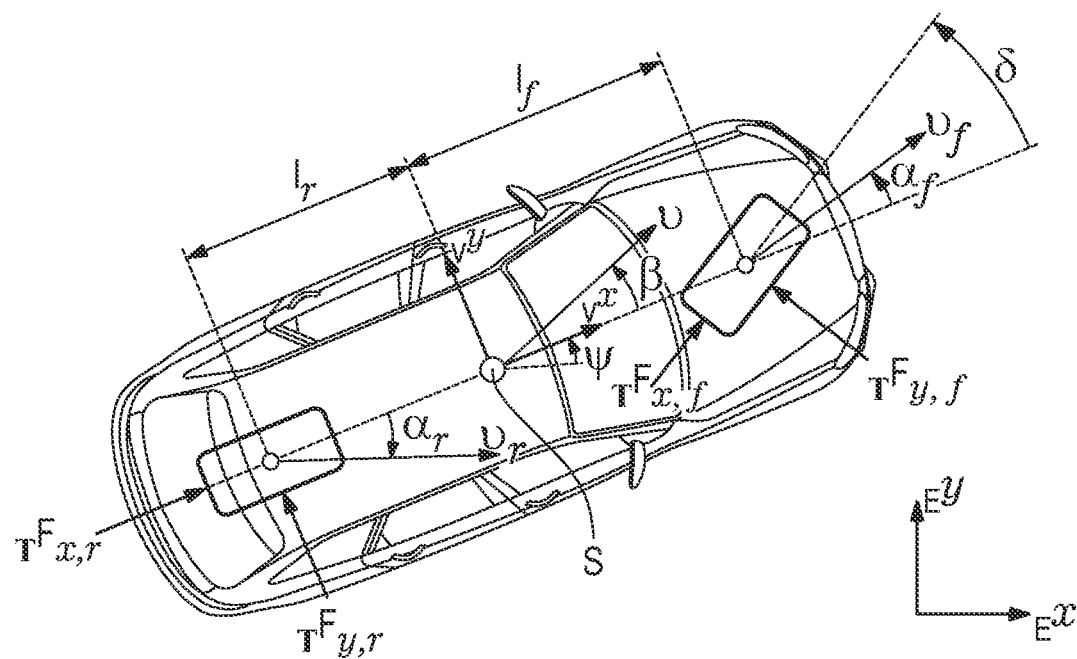
FIG. 4 shows schematically a mathematical replacement model of the motor vehicle.

An example of such a mathematical replacement model is shown in FIG. 4. This mathematical replacement model is a non-linear, single-track model of the motor vehicle 10.

It should be pointed out that in FIG. 4 a left-hand index "T" stands for a tire-bound coordinate system, a left-hand index "V" for a vehicle-bound coordinate system and a left-hand index "E" for an earth-bound coordinate system.

In the mathematical replacement model, a float angle $\psi$ of motor vehicle 10, slip angle $\alpha_f$ and $\alpha_r$ of front wheels or rear wheels of motor vehicle 10, a yaw angle $\beta$ of motor vehicle 10 and a steering angle $\delta$ of front wheels of motor vehicle 10 are taken into account. Furthermore, the mathematical replacement model includes, as further variables, the speed v of the motor vehicle, the forces F acting on the motor vehicle 10 and the longitudinal distances $l_r$ and $l_f$ of the front wheels of the motor vehicle 10 and the rear wheels of the motor vehicle 10 from the center of gravity S of the motor vehicle 10.

One or more of the above-mentioned variables can be recorded by the at least one further sensor 26 and transmitted to the prediction module 46 via the vehicle module 38. In particular, the float angle, the slip angle, the yaw angle, the steering angle, the current acceleration, and/or the current speed of the motor vehicle are recorded by the at least one further sensor 26.

The following equations result from the approach of a force equilibrium and a moment equilibrium:

$$\dot{v} = \frac{\sum vF_x\cos\beta + \sum vF_y\sin\beta}{m}$$

$$\dot{\beta} = \frac{\sum vF_y\cos(\beta) - \sum vF_x\sin(\beta)}{mv} - \dot{\psi}$$

$$\ddot{\psi} = \frac{-vF_{y,r}l_r + -vF_{y,f}l_f\cos\delta + vF_{x,f}l_f\sin\delta}{J_z}$$

In addition, for the position and orientation of motor vehicle 10, the following results:

$$\dot{x} = \cos(\beta+\psi)v$$

$$\dot{y} = \sin(\beta+\psi)v.$$

Using this mathematical replacement model, the trajectory of the motor vehicle 10 can be calculated in advance for known manipulated variables for the actuators of the motor vehicle 10. The manipulated variables for the actuators and/or further control devices of motor vehicle 10 thus represent input variables for the mathematical replacement model.

In summary, the control module 36 is supplied with a plurality of different sets of input variables $u_i$, and the prediction module 46 of the control module 36 determines a corresponding trajectory $\hat{x}_i$ each based on the mathematical replacement model described above.

In this case, constant input variables $u_i$ are used at least over a predefined period of time. In particular, each of the trajectories $\hat{x}_i$ corresponds to a set of manipulated variables for the actuators and/or further control devices of the motor vehicle 10 with a specific steering angle, a specific acceleration and/or a specific deceleration of the motor vehicle 10.

The possible trajectories $\hat{x}_i$ thus determined for the motor vehicle 10 are then forwarded to the comparison module 48.

In general terms, the comparison module 48 compares the determined possible trajectories $\hat{x}_i$ with the reference trajectory T*.

For this purpose, the comparison module 48 assigns a cost factor to each of the possible trajectories $\hat{x}_i$ via a cost functional $J_c(\tau)$, the cost factor being lower the more similar the respective trajectory $\hat{x}_i$ is to the reference trajectory T*.

The cost functional $J_c(\tau)$ comprises a distance term $d(\tau)$ that defines the Euclidean distance of at least one point $(x_P(\tau), y_P(\tau))$ on the possible trajectory $\hat{x}_i$ of at least one corresponding simultaneous point in time $(x_T(\tau), y_T(\tau))$ on the reference trajectory T*. The distance term is calculated $$d(\tau) = \sqrt{(x_T(\tau)-x_p(\tau))^2 + (y_T(\tau)-y_p(\tau))^2}.$$

The cost functional $J_c(\tau)$ also includes an orientation term $o(\tau)$, which takes into account the difference between the course angle $\Delta_T(\tau)$ and the sum of the yaw angle $\beta_P(\tau)$ and the float angle $\psi_P(\tau)$. The orientation term is calculated $$o(\tau) = |\lambda_T(\tau) - (\psi_P(\tau) + \beta_P)|.$$

The distance term $d(\tau)$ and the orientation term $o(\tau)$ are weighted with a first weighting function $\gamma_d(\tau)$ and a second weighting function $\gamma_o(\tau)$, respectively, the first and the second weighting functions being time-dependent.

The cost functional is therefore given by the following expression:

$$J_C(\tau)=\gamma_o(\tau)o(\tau)+\gamma_d(\tau)d(\tau)$$

The choice of the weighting functions $\gamma_o(\tau)$, $\gamma_d(\tau)$ accordingly depends on which points on the possible trajectories are stronger when determining the cost factor and which points are weighted less.

Basically, the first weighting function and the second weighting function are arbitrary functions of time $\tau$. The first and/or the second weighting function are preferably a Gaussian curve, i.e. defined as $$\gamma_{o/d}(\tau) = \frac{1}{\sqrt{2\pi\sigma_{o/d}^2}}\exp\left(-\frac{(\tau-\mu_{o/d})^2}{2\sigma_{o/d}^2}\right)$$

Figure 5:
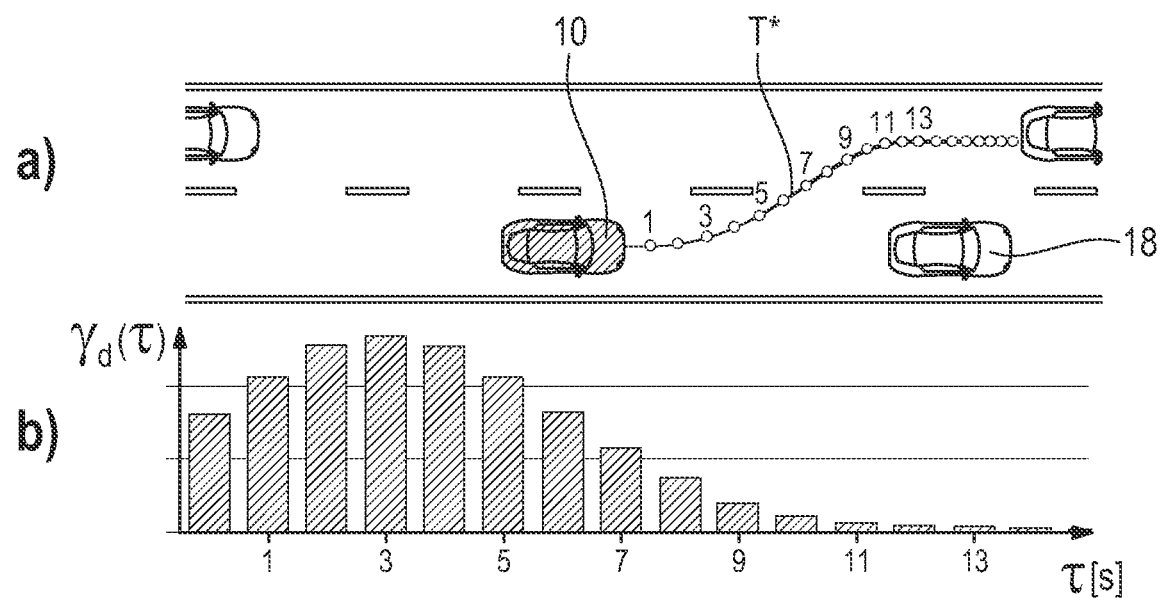
FIG. 5 shows the road traffic situation of FIG. 1 and a diagram of a weighting function to illustrate the inventive method.

A corresponding example for the different weighting of individual points on the possible trajectories is shown in FIG. 5.

FIG. 5(a) shows the road traffic situation of FIG. 1 again, the points on the reference trajectory here being provided with a corresponding numbering which indicates in how many seconds the motor vehicle 10 will reach the respective point.

FIG. 5(b) shows the corresponding weighting of the individual points using a Gaussian function with an expected value $\mu_d$=3 s. Those points that lie on the possible trajectories in the range of $\tau$=3 s are therefore weighted more heavily than points that are very close to 0 s or are longer than 5 s, for example.

Finally, the plurality of possible trajectories $\hat{x}_i$ are transferred to the selection module 50 together with the respective cost factor.

Based on the cost factor, the selection module 50 then selects that trajectory x* of the plurality of possible trajectories $\hat{x}_i$, preferably that trajectory $\hat{x}_i$ whose cost factor is the lowest, at least in comparison with the other possible trajectories $\hat{x}_i$.

In addition, the selection module 50 determines the set of manipulated variables u* belonging to this selected trajectory and transmits this to the vehicle module 38.

The vehicle module 38 then controls the motor vehicle 10 in an at least partially automated manner, in particular fully automatically, based on the set of manipulated variables u* belonging to the selected trajectory. More precisely, the vehicle module 38 transmits the manipulated variables u* to the actuators and/or the further control devices of the motor vehicle 10, which then control the motor vehicle 10 accordingly.

The method described above can be repeated multiple times. In particular, the set of manipulated variables u* is only ever determined for a predefined period, after which the method is repeated.

This is indicated in FIG. 1 by the fact that the possible trajectories only extend over a limited distance, which corresponds to the predefined period of time at the current vehicle speed.

The invention claimed is:

1. A method for an automated control of a motor vehicle comprising:
generating or receiving a reference trajectory (T*) for the motor vehicle;
generating at least two possible trajectories ($\hat{x}_i$) comprising time segments for the motor vehicle, wherein the at least two possible trajectories ($\hat{x}_i$) are each assigned a cost factor by means of a cost functional ($J_c$), the cost functional ($J_c$) comprising points in the time segments of the at least two possible trajectories, and a contribution of each respective point of the points to a respective cost factor is weighted using a time-dependent weighting function, wherein the time-dependent weighting function is based on an amount of time that the motor vehicle will reach the respective point on the at least two possible trajectories, and wherein a time-dependent weighting of one or more points of the points in a middle time segment of the time segments is greater than a time-dependent weighting of one or more points in other time segments of the time segments;
comparing the at least two possible trajectories ($\hat{x}_i$) with the reference trajectory (T*); and
selecting one of the at least two possible trajectories ($\hat{x}_i$) based on the comparison of the at least two possible trajectories ($\hat{x}_i$) with the reference trajectory (T*), wherein the motor vehicle is controlled at least based on the selected possible trajectory.

2. Method according to claim 1, wherein the possible trajectories ($\hat{x}_i$) are generated by means of a mathematical replacement model of the motor vehicle, wherein the mathematical replacement model is a non-linear model or a single-track model.

3. Method according to claim 2, wherein when generating the possible trajectories ($\hat{x}_i$) at least one input variable is taken into account in the mathematical replacement model, wherein the at least one input variable is a steering movement comprising-a steering wheel angle, an acceleration, a deceleration, a speed, or a yaw rate of the motor vehicle.

4. Method according to claim 3, wherein the at least one input variable is a variable which is detected by means of an in-vehicle sensor comprising an acceleration sensor, a steering angle sensor, a radar, a LIDAR, or a camera.

5. Method according to claim 1, wherein the cost functional ($J_c$) comprises at least a distance of a point on the respective possible trajectory ($\hat{x}_i$) from a corresponding point on the reference trajectory (T*).

6. Method according to claim 5, wherein the weighting function is a first weighting function ($\gamma_d$).

7. Method according to claim 6, wherein the first weighting function is a time-dependent Gaussian curve.

8. Method according to claim 7, wherein the weightings of the points in the earliest of the time segments being greater than the weighting of the points in the latest of the time segments.

9. Method according to claim 5, wherein a course angle, a yaw angle or a float angle of the motor vehicle in the course of the possible trajectories ($\hat{x}_i$) is determined based on a mathematical replacement model and is taken into account in the cost functional including taking into account a difference between the course angle and a sum of the yaw angle and the float angle.

10. Method according to claim 9, wherein the determined course angle, the determined yaw angle, or the determined float angle of the motor vehicle is weighted by means of a second weighting function ($\gamma_o$) that is time-dependent.

11. A control device for a system for controlling a motor vehicle or for a motor vehicle, the control device being designed to carry out a method according to claim 1.

12. A computer program having program code means to carry out the steps of a method according to claim 1 to be executed when the computer program is executed on a computer or a corresponding computing unit of a control device for a system for controlling a motor vehicle or for a motor vehicle, the control device being designed to carry out a method according to claim 1.

* * * * *